United States Patent [19]

Eden

[11] Patent Number: 5,400,169

[45] Date of Patent: Mar. 21, 1995

[54] SCANNING IMAGE SYSTEM

[75] Inventor: Benjamin Eden, Haifa, Israel

[73] Assignee: State of Israel-Ministry of Defense, Armament Development Authority, Rafael, Haifa, Israel

[21] Appl. No.: 76,739

[22] Filed: Jun. 14, 1993

[30] Foreign Application Priority Data

Jun. 16, 1992 [IL] Israel ................................. 102222

[51] Int. Cl.⁶ ........................ G02B 26/08; G02B 5/08; G02B 5/10

[52] U.S. Cl. ........................... 359/208; 359/225; 359/351; 359/859; 250/203.6

[58] Field of Search ............... 359/351, 355, 365, 366, 359/208, 212, 213, 225, 859; 250/203.6

[56] References Cited

U.S. PATENT DOCUMENTS

| | | | |
|---|---|---|---|
| 3,443,853 | 5/1969 | Todd | 359/365 |
| 3,887,263 | 6/1975 | Thompson | 250/203.1 |
| 4,039,246 | 8/1977 | Voight | 359/220 |
| 4,282,527 | 8/1981 | Winderman et al. | 359/859 |
| 4,413,177 | 11/1983 | Godwin et al. | 250/201.1 |
| 4,427,878 | 1/1984 | Buchtel | 359/220 |
| 5,097,356 | 3/1992 | Paulsen | 359/214 |
| 5,129,595 | 7/1992 | Thiede et al. | 244/316 |
| 5,136,413 | 8/1992 | MacDonald et al. | 359/213 |
| 5,161,051 | 11/1992 | Whitney et al. | 359/351 |
| 5,181,145 | 1/1993 | Eden | 359/859 |
| 5,191,469 | 3/1993 | Margolis | 359/366 |

FOREIGN PATENT DOCUMENTS

| | | | |
|---|---|---|---|
| 2228584 | 8/1990 | United Kingdom | G02B 26/10 |
| 2242283 | 9/1991 | United Kingdom | G02B 17/06 |

Primary Examiner—Loha Ben
Assistant Examiner—John Juba, Jr.
Attorney, Agent, or Firm—Helfgott & Karas

[57] ABSTRACT

A multi-spectral optical imaging system comprising first and second facing, reflective surfaces defining a single optical axis, the first reflective surface being integrally formed on a single piece of metallic material, the single piece of metallic material having a central aperture through which the optical axis extends and a plurality of elongate rib members integrally formed thereon which define therebetween a plurality of openings communicating with the central aperture; and the second reflective surface having a focus on the optical axis, whereby radiation impinging on the first reflective surface is reflected therefrom towards the second reflective surface and further reflected from the second reflective surface towards the focus; scanning element associated with the second reflective surface for causing the second reflective surface to undergo scanning motion; beamsplitting element receiving radiation reflected from the second reflective surface; and plural detectors, each operating at a different optical wavelength and receiving radiation from the beamsplitting element.

23 Claims, 2 Drawing Sheets

SCANNING IMAGE SYSTEM

FIELD OF THE INVENTION

The present invention relates to optical systems generally and more particularly to dual optical systems.

BACKGROUND OF THE INVENTION

Various types of dual mode optical systems exist and these include telescopes that operate at two different wavelengths. Applicant/Assignee's published U.K Patent Application 2242283 describes an optical imaging system made from a single piece of material, which is stated to be suitable for use in a two wavelength optical system.

SUMMARY OF THE INVENTION

The present invention seeks to provide an improved dual mode optical system including scanning means and a plurality of IR and CCD detectors sharing the same optics.

There is thus provided in accordance with a preferred embodiment of the present invention a multi-spectral optical imaging system comprising:

first and second facing, reflective surfaces defining a single optical axis, the first reflective surface being integrally formed on a single piece of metallic material, the single piece of metallic material having a central aperture through which the optical axis extends and a plurality of elongate rib members integrally formed thereon which define therebetween a plurality of openings communicating with the central aperture; and the second reflective surface having a focus on the optical axis, whereby radiation impinging on the first reflective surface is reflected therefrom towards the second reflective surface and further reflected from the second reflective surface towards the focus;

scanning means associated with the second reflective surface for causing the second reflective surface to undergo scanning motion;

beamsplitting means receiving radiation reflected from the second reflective surface; and plural detectors, each operating at a different optical wavelength and receiving radiation from the beamsplitting means.

The first and second reflective surfaces may be spherical or aspheric, and in accordance with a preferred embodiment they have an external configuration that is generally circular when projected parallel to the optical axis, the diameter of the first reflective surface being greater than the diameter of the second reflective surface.

In accordance with a preferred embodiment, the single piece of material also includes integrally formed baffle means disposed between the first reflective surface and the rib members which are operative to at least partially prevent the impingement of stray radiation on the reflective surfaces.

In accordance with another embodiment, there is also provided baffle means integrally formed with the scanning means which are operative to at least partially prevent the impingement of stray radiation on the detectors.

In accordance with yet another embodiment, the scanning means and the second reflective surface are integrally formed.

In accordance with a further embodiment, any one of the detectors may be a single, line or matrix detector; and the scanning means is in a scanning mode when a single or line detector is employed and in a locked mode when a matrix detector is employed.

In accordance with another embodiment, at least one corrected lens is provided between the beamsplitter and at least one of the detectors.

In accordance with yet another embodiment, at least one of the reflective surfaces is formed by diamond turning and the single piece of metallic material is aluminum or beryllium.

In accordance with a further embodiment, the system is configured to be a Cassegrainian system.

In accordance with another embodiment, the singe piece of material is fixedly mounted to a stationary base and also provides a housing for any of the following: detectors, rate sensors, scanner positioning means and electronic boards.

In accordance with yet another embodiment of the invention, the single piece of material is provided with two precision holes for mounting the system on bearings which are operative to stabilize and precisely balance the system.

BRIEF DESCRIPTION OF THE DRAWINGS

The present invention will be more fully understood and appreciated from the following detailed description of one preferred embodiment, taken in conjunction with the drawings, in which.

DETAILED DESCRIPTION OF THE INVENTION

Figure 1:
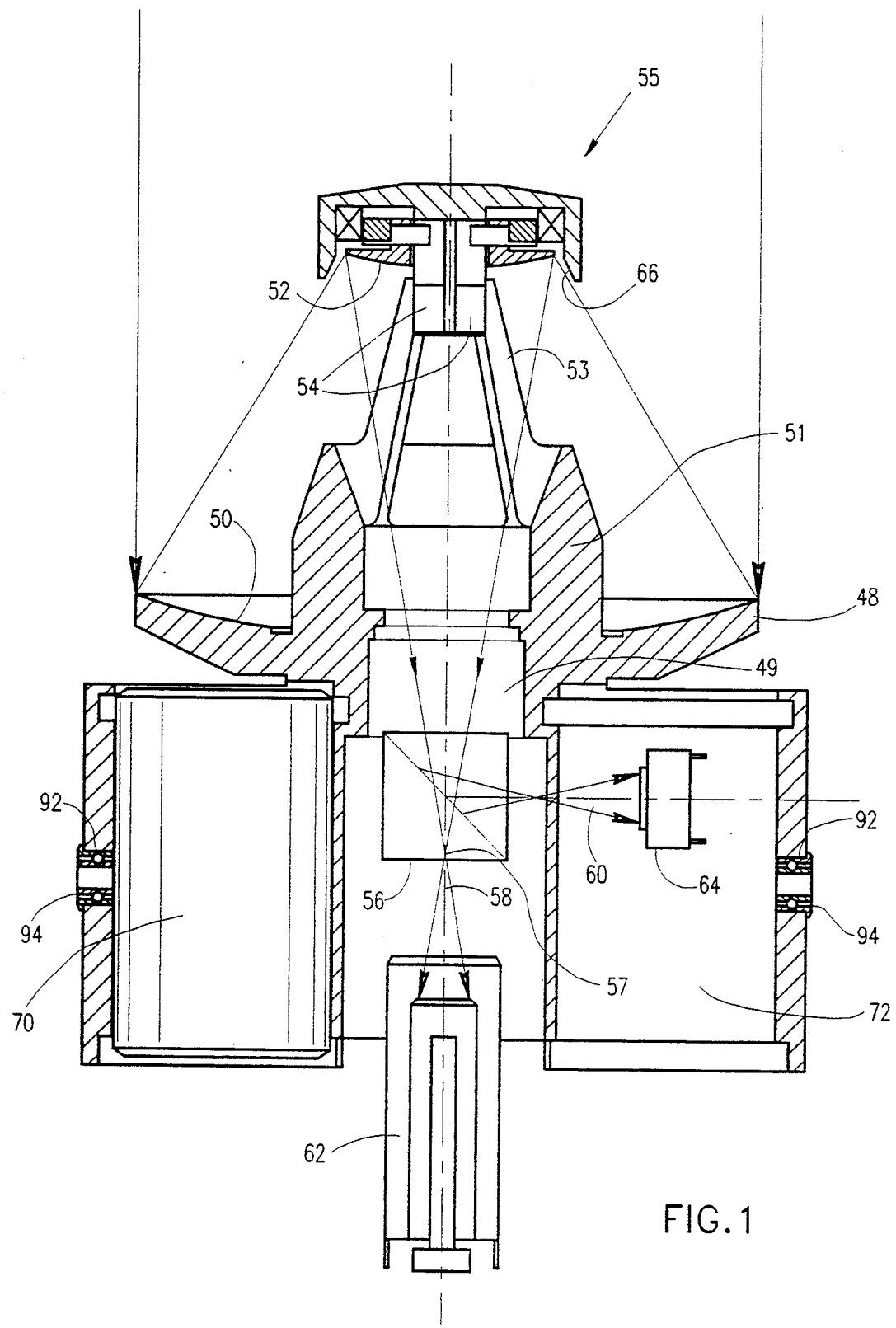
FIG. 1 is a sectional illustration of a bi-spectral optical imaging system constructed and operative in accordance with a preferred embodiment of the present invention.

Reference is now made to FIG. 1 which is a sectional illustration of a hi-spectral Cassegrain-type optical imaging system constructed and operative in accordance with a preferred embodiment of the present invention. The system of FIG. 1 consists of a single piece of metallic material 48, on which a primary reflecting surface 50 is precisely formed. The single piece of metallic material is preferably composed of aluminum or beryllium, and made be of variable dimensions, depending upon the specific application. For most applications, primary reflecting surface 50 will have a diameter of between 2" and 10", although a diameter of 40" or more is also possible.

According to a preferred embodiment of the invention, primary reflecting surface 50 is formed by diamond turning of metallic material 48 itself. Alternatively or additionally, a reflective coating may be applied to surface 50 by means of a suitable deposition or replication process, as it is known in the art.

The single piece of metallic material has a central aperture 49, and a plurality of elongate rib members 53 which are integrally formed therewith. Rib members 53 define therebetween a plurality of openings which communicate with central aperture 49.

A secondary reflective surface 52 and a scanning assembly 55 are mounted on top of rib members 53 by means of a housing and positioning assembly 54. Primary and secondary reflective surfaces 50 and 52 are optically coaxial, with secondary reflecting surface 52, defining a focus that is incident at a point 57 posterior to central aperture 49. Because of this construction, radiation impinging on primary surface 50 will be reflected to secondary surface 52 and back again to focus 57 of secondary surface 52.

Primary reflecting surface 50 and secondary reflecting surface 52 typically are full circle, spheric reflective surfaces; alternatively, they may be aspheric.

In a preferred embodiment, primary reflecting surface 50 and secondary reflecting surface 52 have an external configuration that is generally circular when projected parallel to their optical axis, the diameter of primary reflecting surface 50 being greater than the diameter of secondary reflecting surface 52.

Scanning assembly 55 is operative to scan secondary reflecting surface 52, and may be any suitable type of self-contained scanning assembly, as is known in the art. Housing and scanning assembly 54 preferably is a photodiode-LED assembly, but any other scanning assembly as known in the art may be used. According to a preferred embodiment of the invention, scanning assembly 55 is constructed and operative in accordance with the teachings of applicant's U.S. Pat. No. 5,097,356, entitled SCANNING DEVICE, the disclosure of which is hereby incorporated herein by reference. Particular reference is made to FIG. 1 thereof.

In accordance with another preferred embodiment of the invention, scanning assembly 55 and secondary reflecting surface 52 are integrally formed.

As is known in the art, single axis optical systems may also require baffles to minimize interference from stray radiation. Accordingly, in a preferred embodiment of the invention, single piece of metallic material 48 is provided with an integrally formed baffle portion 51 which interposes between first reflective surface 50 and rib members 53, so as to at least partially prevent the impingement of stray radiation on the reflecting surfaces.

In accordance with another preferred embodiment of the invention, scanning assembly 55 is also provided with a structural baffle portion 66, preferably having a thickness of less than 10 mm., so as to prevent the impingement of stray radiation on the detectors more fully described hereinbelow.

A beamsplitter 56 typically of the dichroic type, is mounted on the underside of the single piece of metallic material, at focus 57 of secondary reflecting surface 52. Beamsplitter 56 receives radiation reflected from secondary reflecting surface 52 and defines two output beams 58 and 60. Beam 58 is directed typically to an IR detector 62, while beam 60 is directed typically to a visible spectrum detector 64, which is preferably a CCD detector but which may be alternatively any other suitable detector, such as a laser beam detector. In one embodiment, detectors 62 and 64 may both be IR detectors, operative in different wavelength ranges, such as 3–5 microns and 8–12 microns.

It will be appreciated that the unitary structure of the apparatus makes it possible to obtain very accurate positioning of the detectors with respect to the optical axis, the beamsplitter and the other optical elements of the system.

In accordance with a preferred embodiment of the invention any one or both of the detectors may be a single, line or matrix detector such as a visible CCD and IR detector in the 3–5 or 8–12 micron range, and any suitable combination of the above types of detectors may be employed. Scanning assembly 55 is operative in a scanning mode when single or line detectors are employed and is kept in a locked mode when a matrix detector is employed.

The system of FIG. 1 may be operative for simultaneous detection at more than two wavelengths by provision of additional suitable beam splitting apparatus. Alternatively, the system may be designed so as to allow for single or multiple fields of view, for example, by the addition of a small lens between the beamsplitter and one of the detectors.

Enhanced imaging quality may be achieved by the addition of one or more corrective lenses (not shown) along the optical path between reflective surface 52 and detectors 62 and 64. Preferably, the corrective lenses are formed of multi-spectral refractive material, enabling transmission of both visible and IR radiation and are small in size relative to primary reflective surface 50.

The single piece of metallic material also provides a suitable housing for the additional electronic components associated with the invention. FIG. 1 illustrates the housing of a rate sensor 70 which is used for the inertial stabilization of the system, and an additional space 72 is also available for elements such as electronic boards, pre-amplifiers for the detectors, and other electro-mechanical devices as are known in the art.

Figure 2:
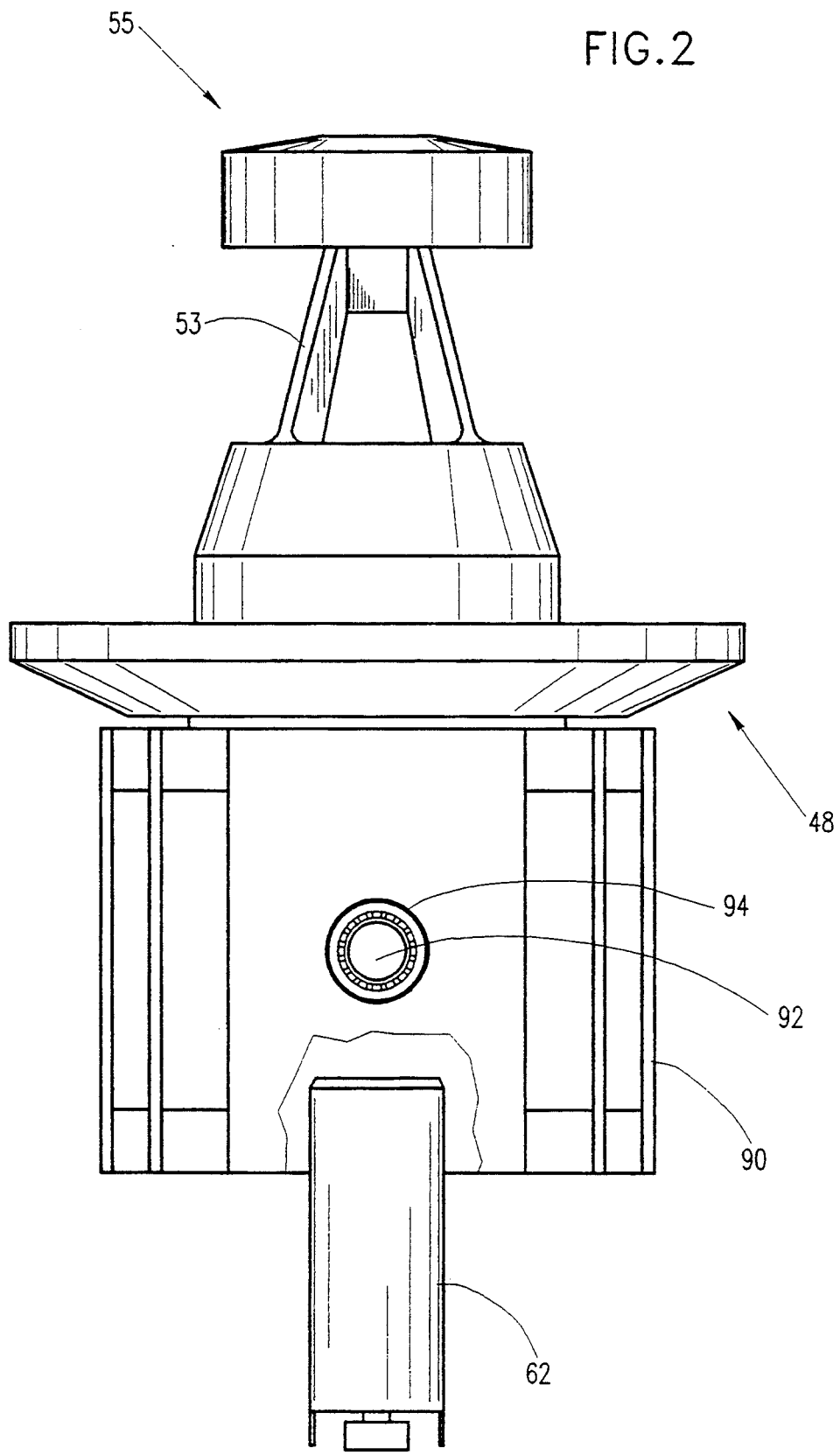
FIG. 2 is a side view illustration of the system of FIG. 1.

Reference is now also made to FIG. 2, which illustrates the outer configuration of the system of FIG. 1. It may be seen that one or more signal processing electronics boards 90 may be conveniently and compactly mounted on the single piece of metallic material. Alternatively or additionally, the single piece of metallic material may be utilized to fixedly attach the system to other structures (not shown).

The unitary metallic structure of the invention also enables very precise positioning, stabilizing, balancing and alignment of the optical system. This is accomplished by means of two precision holes 92 which are formed in the base portion of the metallic structure and which accommodate bearings 94 for stabilizing and balancing the system.

It will also be appreciated that because of its compact, unitary structure, the optical system of the present invention is low in weight, a thermal (i.e., insensitive to changes in temperature), resilient and rugged.

It will be appreciated by persons skilled in the art the scope of the present invention is not limited by what has been specifically shown and described hereinabove by way of example. The scope of the present invention is limited rather, solely by the claims, which follow:

I claim:

1. A multi-spectral optical imaging system comprising:

at least first and second facing, reflective surfaces defining a single optical axis;

the first reflective surface integrally formed on a single piece of metallic material and defining a central aperture through which the optical axis extends, the single piece of material also comprising a plurality of elongate rib members integrally formed thereon, the plurality of elongate rib members defining therebetween a plurality of openings communicating with the central aperture;

the second reflective surface defining a focus lying on the optical axis, whereby radiation impinging on the first reflective surface is reflected therefrom towards the second reflective surface and further reflected from the second reflective surface towards the focus;

scanning means associated with the second reflective surface for causing the second reflective surface to undergo scanning motion;

beamsplitting means for receiving radiation reflected from the second reflective surface; and plural detectors, each operating at a different optical wavelength and receiving radiation from the beamsplitting means.

2. A system according to claim 1 and wherein the reflective surfaces are spherical.

3. A system according to claim 1 and wherein the reflective surfaces are aspheric.

4. As system according to claim 1 and wherein each of the first and second reflective surfaces has an external configuration that is generally circular when projected parallel to the optical axis and the diameter of the first reflective surface is greater than the diameter of the second reflective surface.

5. A system according to claim 1, and wherein the single piece of metallic material also comprises integrally formed first baffle means disposed between the first reflective surface and the rib members, the first baffle means being operative to at least partially prevent the impingement of stray radiation on the reflective surfaces.

6. A system according to claim 5, and also including second baffle means integrally formed with the scanning means, the second baffle means being operative to at least partially prevent the impingement of stray radiation on the detectors.

7. A system according to claim 1 and wherein the scanning means and the second reflective surface are integrally formed.

8. A system according to claim 1 and wherein at least one of the detectors is one of the following: a single element detector, a line detector and a matrix detector.

9. A system according to claim 8, in combination with a matrix detector and wherein the scanning means is in a locked mode.

10. A system according to claim 8 and also including at least one corrected lens between the beamsplitter and at least one of the detectors.

11. A system according to claim 6, and wherein the scanning means is encapsuled in the baffle means and is of a thickness of less than 10 mm.

12. A system according to claim 8 wherein the plural detectors share the same optics and have different fields of view.

13. A system according to claim 1 wherein at least one of the reflective surfaces is formed by diamond turning.

14. A system according to claim 1 wherein at least one of the reflective surfaces comprises a reflective coating layer, formed by replication or deposition.

15. A system according to claim 1 wherein the single piece of metallic material is aluminum or beryllium.

16. A system according to claim 1 and wherein the single piece of metallic material provides a housing for the detectors.

17. A system according to claim 1 and also comprising rate sensors affixed to the single piece of metallic material for inertial stabilization of the system.

18. A system according to claim 1 and also comprising electronic boards affixed to the single piece of metallic material.

19. A system according to claim 1 and also comprising scanner positioning means affixed to the single piece of metallic material, for positioning said scanner.

20. A system according to claim 1 wherein the single piece of metallic material is fixedly mounted on a stationary base.

21. A system according to claim 1 and wherein the single piece of metallic material also comprises two precision holes and bearings for balancing of the system.

22. A system according to claim 1 and wherein at least one of the plural detectors is operative for detecting laser radiation.

23. A system according to claim 1 and wherein the system is a Cassegrainian system.

* * * * *